United States Patent [19]

Gentile et al.

[11] 3,775,224

[45] Nov. 27, 1973

[54] SPLICE TAPE HANDLING MECHANISM

[75] Inventors: Ralph Gentile, Rochester; Willis G. Calberg, Hilton, both of N.Y.

[73] Assignee: Eastman Kodak Company, Rochester, N.Y.

[22] Filed: Apr. 10, 1972

[21] Appl. No.: 242,502

[52] U.S. Cl. .................156/506, 156/159, 156/545

[51] Int. Cl. ................................................ B31f 5/00

[58] Field of Search.................... 156/157, 159, 304, 156/502, 505, 506, 544, 545; 242/58.5

[56] References Cited

UNITED STATES PATENTS 3,634,171 1/1972 Rosborough........................ 156/506

*Primary Examiner*—William A. Powell
*Attorney*—William T. French et al.

[57] ABSTRACT

A splicing tape handling mechanism for use in a processing system or the like to facilitate matching a customer's envelope with a corresponding filmstrip. The splice tape handling mechanism applies splice tape chips containing corresponding identification indicia, such as numbers, to the customer's envelope and to the film end portions of a pair of filmstrips for joining the two, one of which matches the customer's envelope. After the filmstrips have been processed, they are fed through subsequent operations such as printing and slitting to form film transparencies which are packaged in the envelopes containing corresponding identification indicia.

8 Claims, 2 Drawing Figures

SPLICE TAPE HANDLING MECHANISM

BACKGROUND OF THE INVENTION

1. Field of the Invention

This invention relates generally to tape handling mechanisms, and more specifically to a heat sealable splice tape handling mechanism for substantially simultaneously applying a pair of tape chips having corresponding identification indicia to a customer's envelope and matching filmstrip.

2. Description of the Prior Art

It is generally known in the art to apply corresponding identification symbols or indicia to a customer's film and matching envelope to permit rematching the two following subsequent operations. For example, it is known to perforate the customer's film with one indicia and the matching envelope with a corresponding indicia. It is further known to apply an indicia bearing tape to the customer's envelope, and a corresponding tape to a matching filmstrip while splicing the matching filmstrip to an adjacent strip of film. Such a web splicing and identifying apparatus is described in U.S. Pat. No. 3,634,171. The purpose of applying the corresponding identification indicia to a customer's envelope and filmstrip is to permit rematching of the two after the filmstrip has undergone several processing steps. A need exists for an improved apparatus for accomplishing the aforementioned objective so that there is no loss of identification between the customer's film and matching envelope.

SUMMARY OF THE INVENTION

In accordance with a preferred embodiment of the invention, a splicing mechanism is provided in which two tape strips are intermittently transported by any suitable means to position end portions of the tape strip at an operating station. A pair of holding means are provided at a tape holding station for releasably holding the tape end portions which are severed by any suitable knife means to provide a pair of tape chips having corresponding indicia thereon. Moving means are provided for moving one of the holding means into engagement with the aligned end protions of a film and web for applying a tape chip thereto for joining the two, and moving the other holding means into engagement with a corresponding customer's envelope for applying the corresponding tape chip thereto. Accordingly, after the film is subjected to subsequent operating steps, it may be readily rematched with the corresponding envelope.

Additional features of the invention involve providing a fluid pressure source connected to at least one of the holding means to assist in separating the tape chip therefrom following the splicing operation. Any suitable valve means are interposed between the holding means and the vacuum and fluid pressure sources for applying vacuum and pressure to the holding means in proper timed relation. A vacuum support platen is provided at the splicing station connected to the vacuum source for releasably holding the spliced end portions of the film and web on the platen.

In a more specific embodiment, the tape strip transport means comprises any suitable transport roller, the holding means comprises a pair of pivotal arms arranged substantially a right angles to one another with perforated flat end surfaces thereof connected to the vacuum source. The arms are movable between a normal initial position, in which the end surfaces are adjacent one another at the tape holding station for receiving corresponding tape chips, and a final position, in which the end surfaces apply the tape chips to the aligned film and web ends and to the envelope. The moving means comprises a fluid cylinder coupled by shafts and gears to the pivotal arms.

It is, accordingly, one of the objects of the present invention to provide a splice tape handling mechanism for forming a pair of tape chips having corresponding identifying indicia, and applying one of the chips to a customer's envelope, and the other chip over the ends of the matching customer's filmstrip and another filmstrip for splicing the two together.

Another object of the invention is to provide an improved splice tape handling mechanism that is of simple design and construction, thoroughly reliable and efficient in operation, and economical to manufacture.

The invention and its objects and advantages will become more apparent from the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Figure 1:
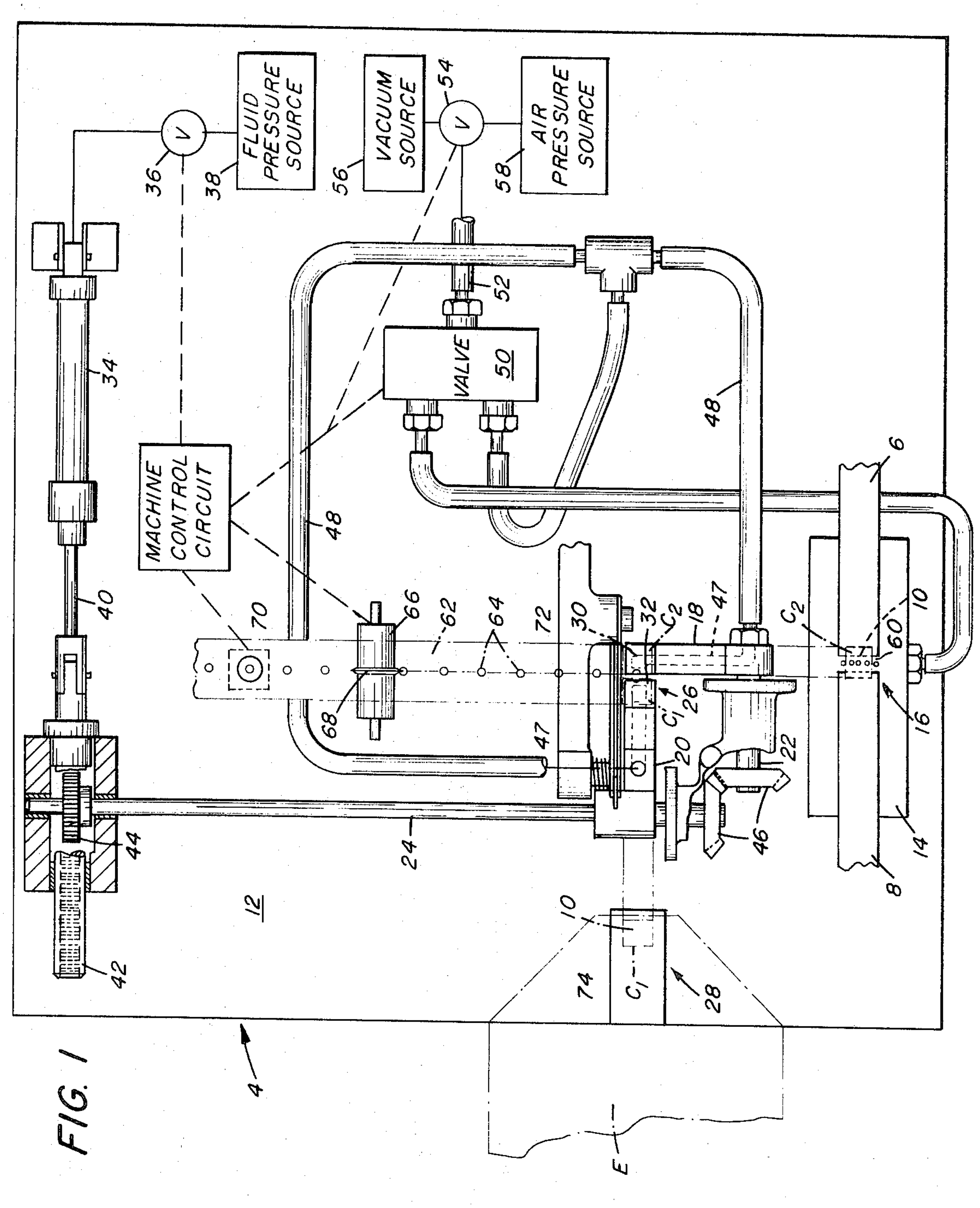
FIG. 1 is a top plan view, partly in section and partly in block diagram form, illustrating a splice tape handling mechanism in accordance with this invention, in which the tape chip applying arms are shown in full lines in their loading position at a common loading station for receiving tape chips, and in broken lines, in their tape chip applying positions at the envelope receiving and film splicing stations.
Figure 2:
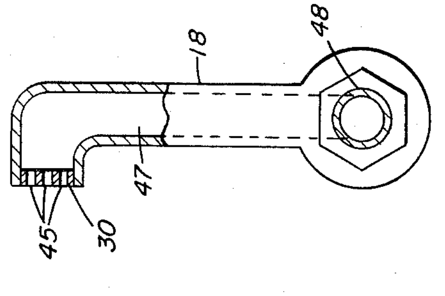
FIG. 2 is an enlarged side elevational view partially in section of a tape chip applying arm.

Because splicing apparatus for splicing customers' strips of film and applying corresponding identification indicia to the film and matching envelope are well known, the present description will be directed in particular to elements forming part of, or cooperating more directly with the splice tape handling mechanism in accordance with this invention. Splicing apparatus elements and film and tape transport mechanisms not specifically shown or described herein should be understood to be selectable from those known in the art.

The splice tape handling mechanism of this invention is illustrated in connection with a splicing apparatus generally designated at 4 of the type in which leading and trailing ends 6,8 of strips of customers' film are spliced together to form a continuous strip for processing. In such apparatus, tape chips 10 having corresponding identifying indicia are placed on each strip of customers' film and the matching customers' envelope for receiving the film after it is processed. The splicing apparatus 4 has a base 12 supporting a film track 14 for guiding the leading and trailing ends 6,8 of customers' strips of film which are to be spliced together. The leading and trailing ends 6,8 of the film strips are positioned by any suitable means, not shown, at a film splicing station 16 on the base where the two ends are spliced together.

More specifically, the splice tape handling mechanism in accordance with this invention comprises a pair of similar tape chip applying arms 18, 20 secured to rotatably mounted shafts 22, 24 arranged transverse to one another. The arms 18, 20 are rotatably movable between loading positions at a common loading station 26, as seen in full lines in the drawing, and tape chip applying positions at separate film splicing and enelope receiving stations 16, 28 as seen in broken lines. The arms 18, 20 are arranged such that in their loading positions, tape chip receiving surfaces 30, 32 at the ends thereof are adjacent one another. The drive mechanism for imparting rotation to arms 18, 20 may comprise, for example, a suitable fluid cylinder 34 coupled by a solenoid operated fluid valve 36 to a pressurized fluid supply source 38 for imparting reciprocal movement to cylinder rod 40. The rod 40 is coupled to a gear rack 42 which drives a pinion 44 secured to shaft 24, and adjacent ends of shafts 22, 24 are coupled together by bevel gears 46 arranged transverse to one another for driving shaft 22. Accordingly, reciprocal movement of gear rack 42 by cylinder 34 causes arms 18, 22 to be simultaneously reciprocally moved between their loading and tape chip applying positions. The tape chip receiving surfaces 30, 32 of arms 18, 22 at their loading position lays substantially in a horizontal plane, and are provided with perforations 45 connected to cavities 47 within the arms. The cavities 47 are connected by any suitable tubing 48 or the like to an air valve 50 which is in turn connected by separate tubing 52 and valve 54 to a vacuum source 56 and low air pressure source 58. Accordingly, in one position of valves 50, 54, a vacuum is applied to tape chip receiving surfaces 30, 32 and in another position thereof, the low pressure air source 58 is connected to the tape chip receiving surfaces, and the vacuum 56 is connected to a perforated film supporting anvil 60 at the film splicing station 16. Electrical heating elements or the like, not shown, may be incorporated in arms 18, 20 for applying tape chips designated $C_1$, $C_2$ at the film splicing and envelope receiving stations 16, 28 under heat and pressure.

The tape 62 used with this splice tape handling mechanism may be any suitable tape having a preferably heat sealable adhesive surface on one side and aligned pairs of corresponding identifying indicia such as numbers, not shown, on the opposite side. The tape 62 is further preferably provided with equidistantly spaced perforations 64 along the central axis thereof of a pitch substantially equal to the width of a customer's film. The base 4 has a tape track, not shown, arranged transverse to film track 14 and terminating at the loading station 26. The tape 62 is advanced in steps by any suitable transport roller 66 having a peripheral knife 68 centrally arranged along the axis of the roller for simultaneously advancing the tape and severing it along its central axis to form two strips of tape of substantially equal width. A photocell 70 is arranged to cooperate with the perforations 64 for actuating a suitable central circuit (not shown) for controlling a transport roller drive mechanism, not shown, for advancing tape 68 in steps a distance of one pitch. After each tape advance, the leading ends of the tapes extend over and are in register with the tape chip receiving surfaces 30, 32 of the arms 18, 20 respectively in their loading position. A machine logic of any suitable type actuates the air valves 50, 54 to provide suction at the receiving surfaces 30, 32, and further actuates a cutting mechanism 72 for severing tape 62 transverse to its central axis into tape chips $C_1$, $C_2$ having corresponding identifying indicia such as numbers, not shown. The severed chips $C_1$, $C_2$ are releasably secured to the receiving surfaces by the vacuum. Assuming that the operator has placed an envelope E on an envelope receiving anvil 74 at the envelope receiving station 28, and has positioned the leading and trailing ends 6, 8 respectively of a pair of filmstrips at splicing station 16 in position to be spliced together, a machine control circuit (not shown) may be arranged to actuate fluid cylinder 34 for moving arms 18, 20 from their loading position to their chip applying positions for substantially simultaneously applying with heat and pressure chip $C_1$ to the envelope and chip $C_2$ onto the film ends, one of which matches the envelope E, for splicing the filmstrips together. The control circuit may also be arranged to actuate air valves 50, 54 for disconnecting vacuum source 56 from tape chip receiving surfaces 30, 32, for applying the vacuum to anvil 60 at film splicing station 16 for releasably holding the film ends and chip $C_2$ at the splicing station, and for connecting the air pressure source 58 to the chip receiving surfaces 30, 32 to separate the chips $C_1$, and $C_2$ from such surfaces. Substantially simultaneously, fluid cylinder 34 is actuated for returning tape chip applying arms 18, 20 to their normal loading positions at loading station 26.

The invention has been described in detail with particular reference to a preferred embodiment thereof, but it will be understood that variations and modifications can be effected within the spirit and scope of the invention as described hereinabove.

I claim:

1. In a splicing mechanism for substantially simultaneously splicing together aligned end portions of a film and web with a first tape chip at a splicing station, and applying a corresponding identifying second tape chip to an envelope for receiving said film at an envelope receiving station, the combination comprising:

means for feeding the end portions of two tape strips having corresponding indicia to an operating station;

first and second means at said operating station for releasably holding said tape strip end portions, respectively;

means for severing said tape strip end portions to form corresponding first and second tape chips on said first and second holding means respectively; and means for moving said first and second holding means for applying with pressure said first and second tape chips to said film and envelope respectively at said splicing and envelope receiving stations for splicing said film to the web and identifying the corresponding envelope to receive said film.

2. The invention according to claim 1 wherein said first and second holding means each comprises a pivotally mounted arm.

3. The invention according to claim 1 wherein said first and second holding means each comprises an arm, said arms being mounted for pivotal movement at substantially right angles to one another.

4. The invention according to claim 1 wherein said first and second holding means each comprises an arm, said arms being mounted for pivotal movement at substantially right angles to one another, and means comprising a pair of racks and pinions for pivotally moving said arms through an angle of substantially 180°.

5. The invention according to claim 1 wherein each of said first and second holding means comprises a pivotally mounted arm having a vacuum head at one end for releasably holding one of said first and second tape chips in its initial position, said arms being mounted for pivotal movement at substantially right angles to one another through an angle of substantially 180° to a final position in which said first and second tape chips are applied under pressure to said film and envelope.

6. The invention according to claim 5 and further including a vacuum source and a fluid pressure source, and means for selectively connecting said vacuum and fluid pressure sources to said vacuum head.

7. The invention according to claim 6 wherein said connecting means connects said vacuum source to said heads when said arms are in their initial position, and connects said fluid pressure source to said heads after said arms reach their final positions to prevent said chips from adhering to said heads.

8. The invention according to claim 1 wherein a vacuum platen is provided at said splicing station and said first and second tape chips are heat and pressure sealable, each of said first and second holding means comprises a pivotally mounted arm having a heating element and a vacuum head at one end for releasably holding one of said first and second tape chips in its initial position, said arms being mounted for pivotal movement at right angles to one another through an angle of substantially 180° to a final position at said splicing and envelope receiving stations in which said first and second tape chips are applied under heat and pressure to said film and envelope, a vacuum source, a fluid pressure source, and means for selectively connecting said vacuum source to said head when said arms are in their initial position, and said vacuum source to said vacuum platen and said fluid pressure source to said head after said arms reach their final position to hold said chip and film at said splicing station and to separate said chips from said heads as said arms are returned to their initial position.

* * * * *